United States Patent
Falco (10) Patent No.: US 10,798,146 B2
(45) Date of Patent: Oct. 6, 2020

(54) SYSTEM AND METHOD FOR UNIVERSAL TIMEOUT IN A DISTRIBUTED COMPUTING ENVIRONMENT

(71) Applicant: Oracle International Corporation, Redwood Shores, CA (US)

(72) Inventor: Mark Falco, Burlington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 465 days.

(21) Appl. No.: 15/200,897

(22) Filed: Jul. 1, 2016

(65) Prior Publication Data

US 2017/0005863 A1 Jan. 5, 2017

Related U.S. Application Data

(60) Provisional application No. 62/187,531, filed on Jul. 1, 2015.

(51) Int. Cl.
*H04L 12/24* (2006.01)
*H04L 12/26* (2006.01)
*H04L 29/08* (2006.01)
*G06F 9/48* (2006.01)

(52) U.S. Cl.
CPC ............... *H04L 67/02* (2013.01); *G06F 9/48* (2013.01)

(58) Field of Classification Search
CPC ... H04L 67/02; G06F 9/48; G06F 9/52; G06F 2209/481
USPC ........................................................ 709/221
See application file for complete search history.

(56) References Cited

U.S. PATENT DOCUMENTS

| 5,784,569 A | 7/1998 | Miller |
| 5,819,272 A | 10/1998 | Benson |
| 5,940,367 A | 8/1999 | Antonov |
| 5,991,894 A | 11/1999 | Lee |
| 5,999,712 A | 12/1999 | Moiin |
| 6,182,139 B1 | 1/2001 | Brendel |
| 6,263,358 B1 * | 7/2001 | Lee .................. G06F 8/458 718/100 |

(Continued)

FOREIGN PATENT DOCUMENTS

EP 0928089 A2 7/1999

OTHER PUBLICATIONS

European Patent Office, International Searching Authority, International Search Report and Written Opinion dated Jan. 12, 2016 for International Application No. PCT/US2015/052060, 14 pages.

(Continued)

*Primary Examiner* — Abdullahi E Salad
(74) *Attorney, Agent, or Firm* — Tucker Ellis LLP (57) ABSTRACT

A system and method for supporting universal timeout in a distributed computing environment. The universal timeout feature can enforce a defined timeout for a block (or group of blocks) or code executing on a thread regardless of the number of network hops required to effectuate the code. The universal timeout feature allows a thread to express a timeout which is respected across the platform thereby improving timeout functionality compared to prior timeout implementations which pass a timeout between functions. Universal timeout may be implemented using a try-with-resources paradigm where the timeout period is treated as a resource.

20 Claims, 3 Drawing Sheets

(56) References Cited

U.S. PATENT DOCUMENTS

| | | | |
|---|---|---|---|
| 6,314,555 B1* | 11/2001 | Ndumu | G06F 8/10 706/49 |
| 6,377,993 B1 | 4/2002 | Brandt | |
| 6,487,622 B1 | 11/2002 | Coskrey | |
| 6,490,620 B1 | 12/2002 | Ditmer | |
| 6,505,341 B1* | 1/2003 | Harris | G05B 11/42 716/117 |
| 6,553,389 B1 | 4/2003 | Golding | |
| 6,615,258 B1 | 9/2003 | Barry | |
| 6,631,402 B1 | 10/2003 | Devine | |
| 6,693,874 B1 | 2/2004 | Shaffer | |
| 6,714,979 B1 | 3/2004 | Brandt | |
| 6,826,761 B1* | 11/2004 | Damon | G06F 1/14 713/502 |
| 6,965,961 B1* | 11/2005 | Scott | G06F 9/52 710/200 |
| 6,968,571 B2 | 11/2005 | Devine | |
| 7,114,083 B2 | 9/2006 | Devine | |
| 7,139,925 B2 | 11/2006 | Dinker | |
| 7,266,822 B1 | 9/2007 | Boudnik | |
| 7,296,271 B1* | 11/2007 | Chalmer | G06F 9/461 718/108 |
| 7,328,237 B1 | 2/2008 | Thubert | |
| 7,376,953 B2 | 5/2008 | Togasaki | |
| 7,464,378 B1 | 12/2008 | Limaye | |
| 7,543,046 B1 | 6/2009 | Champagne | |
| 7,698,390 B1 | 4/2010 | Harkness | |
| 7,720,971 B2 | 5/2010 | Moutafov | |
| 7,739,677 B1 | 6/2010 | Kekre | |
| 7,792,977 B1 | 9/2010 | Brower | |
| 7,814,248 B2 | 10/2010 | Fong | |
| 7,953,861 B2 | 5/2011 | Yardley | |
| 8,195,835 B2 | 6/2012 | Ansari | |
| 8,209,307 B2 | 6/2012 | Erofeev | |
| 8,312,439 B2 | 11/2012 | Kielstra | |
| 8,397,227 B2 | 3/2013 | Fan | |
| 8,595,714 B1 | 11/2013 | Hamer | |
| 8,862,675 B1* | 10/2014 | Coomer | H04L 51/12 370/349 |
| 9,805,345 B1* | 10/2017 | Dailianas | G06Q 20/102 |
| 9,858,123 B1* | 1/2018 | Dailianas | G06F 9/45558 |
| 9,882,855 B1* | 1/2018 | Twitchell | G06F 9/45558 |
| 9,888,067 B1* | 2/2018 | Yemini | H04L 67/1023 |
| 2002/0026321 A1* | 2/2002 | Faris | A63F 13/12 705/1.1 |
| 2002/0035559 A1 | 3/2002 | Crowe | |
| 2002/0073223 A1 | 6/2002 | Darnell | |
| 2002/0078312 A1 | 6/2002 | Wang-Knop | |
| 2003/0023898 A1 | 1/2003 | Jacobs | |
| 2003/0046286 A1 | 3/2003 | Jacobs | |
| 2003/0066054 A1* | 4/2003 | Aarts | G06F 9/4825 717/129 |
| 2003/0088677 A1* | 5/2003 | Yamamoto | H04L 67/36 709/227 |
| 2003/0120715 A1 | 6/2003 | Johnson | |
| 2003/0135781 A1* | 7/2003 | Da Palma | G06F 11/3664 714/2 |
| 2003/0187927 A1 | 10/2003 | Winchell | |
| 2003/0191795 A1 | 10/2003 | Bernardin | |
| 2004/0059805 A1 | 3/2004 | Dinker | |
| 2004/0153615 A1 | 8/2004 | Koning | |
| 2004/0179471 A1 | 9/2004 | Mekkittikul | |
| 2004/0205148 A1 | 10/2004 | Bae | |
| 2004/0267897 A1 | 12/2004 | Hill | |
| 2005/0021737 A1 | 1/2005 | Ellison | |
| 2005/0083834 A1 | 4/2005 | Dunagan | |
| 2005/0097185 A1 | 5/2005 | Gibson | |
| 2005/0102657 A1* | 5/2005 | Lewis | G06F 9/45516 717/140 |
| 2005/0108710 A1* | 5/2005 | Patiejunas | H04L 29/06 718/100 |
| 2005/0138460 A1 | 6/2005 | McCain | |
| 2005/0193056 A1 | 9/2005 | Schaefer | |
| 2005/0229176 A1* | 10/2005 | Findeisen | G06F 11/3423 718/100 |
| 2005/0262490 A1* | 11/2005 | Thomborson | G06F 21/125 717/145 |
| 2006/0075304 A1* | 4/2006 | Canning | G06F 11/0748 714/38.11 |
| 2006/0080383 A1* | 4/2006 | Hasson | H04L 67/06 709/203 |
| 2006/0095573 A1 | 5/2006 | Carle | |
| 2006/0101081 A1* | 5/2006 | Lin | G06F 17/30362 |
| 2006/0136886 A1* | 6/2006 | Patterson | G06F 9/4825 717/141 |
| 2007/0016822 A1 | 1/2007 | Rao | |
| 2007/0101324 A1* | 5/2007 | Lupu | G06F 9/524 718/1 |
| 2007/0118693 A1 | 5/2007 | Brannon | |
| 2007/0118843 A1* | 5/2007 | Seelig | G06F 9/4843 719/330 |
| 2007/0140110 A1 | 6/2007 | Kaler | |
| 2007/0174160 A1 | 7/2007 | Solberg | |
| 2007/0237072 A1 | 10/2007 | Scholl | |
| 2007/0260714 A1 | 11/2007 | Kalmuk | |
| 2007/0271584 A1 | 11/2007 | Anderson | |
| 2008/0077622 A1 | 3/2008 | Keith | |
| 2008/0126853 A1* | 5/2008 | Callaway | G06F 11/1641 714/13 |
| 2008/0276231 A1 | 11/2008 | Huang | |
| 2008/0281959 A1 | 11/2008 | Robertson | |
| 2008/0288607 A1* | 11/2008 | Muchow | G06F 9/44505 709/209 |
| 2008/0294648 A1* | 11/2008 | Lin | G06F 17/30362 |
| 2009/0144707 A1* | 6/2009 | Goff | G06F 9/54 717/136 |
| 2009/0144714 A1 | 6/2009 | Fan | |
| 2009/0265449 A1 | 10/2009 | Krishnappa | |
| 2009/0276483 A1* | 11/2009 | Lind | G06F 9/466 709/201 |
| 2009/0300766 A1* | 12/2009 | Toub | G06F 21/604 726/26 |
| 2009/0320005 A1 | 12/2009 | Toub | |
| 2010/0037086 A1* | 2/2010 | Mellery | G06F 9/526 714/2 |
| 2010/0064341 A1 | 3/2010 | Aldera | |
| 2010/0128732 A1 | 5/2010 | Jiang | |
| 2010/0211931 A1 | 8/2010 | Levanoni | |
| 2010/0262742 A1* | 10/2010 | Wolfe | G06F 13/26 710/265 |
| 2010/0312861 A1 | 12/2010 | Kolhi | |
| 2011/0041006 A1 | 2/2011 | Fowler | |
| 2011/0071981 A1 | 3/2011 | Ghosh | |
| 2011/0107135 A1 | 5/2011 | Andrews | |
| 2011/0161289 A1 | 6/2011 | Pei | |
| 2011/0179231 A1 | 7/2011 | Roush | |
| 2011/0202924 A1* | 8/2011 | Banguero | G06F 9/485 718/103 |
| 2011/0219208 A1* | 9/2011 | Asaad | G06F 15/76 712/12 |
| 2011/0249552 A1 | 10/2011 | Stokes | |
| 2011/0252192 A1 | 10/2011 | Busch | |
| 2012/0117157 A1 | 5/2012 | Ristock | |
| 2012/0158650 A1 | 6/2012 | Andre | |
| 2012/0207258 A1* | 8/2012 | Malekpour | G06F 1/12 375/357 |
| 2012/0215740 A1 | 8/2012 | Vaillant | |
| 2012/0254118 A1 | 10/2012 | Shah | |
| 2012/0297056 A1 | 11/2012 | Lee | |
| 2012/0297371 A1* | 11/2012 | Greifeneder | G06F 11/3495 717/128 |
| 2013/0047165 A1 | 2/2013 | Goetz | |
| 2013/0152105 A1* | 6/2013 | Bhat | G06F 9/4843 718/108 |
| 2013/0179485 A1* | 7/2013 | Chapman | H04L 67/02 709/201 |
| 2014/0207871 A1* | 7/2014 | Miloushev | G06F 9/5016 709/205 |
| 2014/0281088 A1* | 9/2014 | VanderLeest | G06F 13/26 710/264 |

(56) References Cited

U.S. PATENT DOCUMENTS

| | | | |
|---|---|---|---|
| 2015/0089495 A1* | 3/2015 | Persson | G06F 9/45533 |
| | | | 718/1 |
| 2016/0026504 A1* | 1/2016 | Finnigan | G06F 9/4881 |
| | | | 718/105 |
| 2016/0094408 A1* | 3/2016 | Segu | H04L 67/1004 |
| | | | 709/223 |
| 2016/0170849 A1* | 6/2016 | Cheng | G06F 11/2025 |
| | | | 714/11 |
| 2016/0232039 A1* | 8/2016 | Bertran | G06F 9/48 |
| 2016/0246643 A1* | 8/2016 | Xu | G06F 9/485 |
| 2017/0364335 A1* | 12/2017 | Malka | G06F 8/315 |

OTHER PUBLICATIONS

European Patent Office, Examining Division, Communication pursuant to Article 94(3) EPC dated Sep. 4, 2019 for European Patent Application No. 15781206.6, 8 pages.

Jameela Al-Jaroodi et al., "Middleware Infrastructure for Parallel and Distributed Programming Models in Hetergeneous Systems" (2003). CSE Journal Articles, 13 pages, retrieved Jan. 21, 2016 from: <http://digitalcommons.unl.edu/cgi/viewcontent.cgi?article=1066&context=csearticles>.

Laurent Baduel et al., "Programming, Composing, Deploying for the Grid", Grid Computing: Software Environments and Tools, Springer, 30 pages, retrieved Jan. 21, 2016 from: <https://hal.inria.fr/inria-00486114/document>.

David Wong et al., "Java-based Mobile Agents", Communications of the ACM, Mar. 1999, vol. 42. No. 3, 11 pages.

\* cited by examiner

SYSTEM AND METHOD FOR UNIVERSAL TIMEOUT IN A DISTRIBUTED COMPUTING ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application claims priority to U.S. Provisional Patent Application No. 62/187,531, entitled "SYSTEM AND METHOD FOR UNIVERSAL TIMEOUT IN A DISTRIBUTED COMPUTING ENVIRONMENT" filed Jul. 1, 2015 which application is incorporated herein by reference.

FIELD OF INVENTION

The present invention is generally related to computer systems, and more particularly to a distributed computing environment.

SUMMARY

In a distributed computing environment a thread operating on a node of the distributed computing environment may often make requests for data or execution or request for execution of functions that are submitted to other nodes of the distributed computing environment. Such requests are transmitted over a network between nodes. However, whenever a request is transmitted from the thread to another process over the network there are a number of problems that can lead to delays in the response. While the normal latency for the request is typically a millisecond or so, it is possible that the remote server is inoperative, or the network has been segmented such that the remote server is unreachable. The thread should not wait indefinitely for a response. Typically, a thread implementing a request will apply a timeout to the request.

However, a typical mechanism for specifying timeout is to express a maximum time for a network hop. This mechanism performs poorly in a distributed computing environment where executing a block of code may require multiple network hops. In such case the timeout is applied independently for each hop. If a timeout of 1 second is applied and the executing block of code requires three hops the effective timeout may be up to three seconds. The more hops the greater the effective timeout. This can lead to unpredictability in code execution and poor performance.

Accordingly, it is desirable to provide improved timeout functionality which enhances predictability of code execution timing in a distributed computing environment.

In accordance with embodiments, the present disclosure describes a universal timeout feature which can enforce a defined timeout for a block (or group of blocks) or code executing on a thread regardless of the number of network hops required to effectuate the code. The universal timeout feature allows a thread to express a timeout which is respected across the platform thereby improving timeout functionality compared to prior timeout implementation which pass a timeout between functions.

In a particular embodiment, the present disclosure describes a system and method for universal timeout in a distributed computing environment. In accordance with an embodiment, a method can begin with establishing a universal timeout period, the universal timeout period being associated with the execution of a block. The method can continue with checking against a thread the universal timeout period, the checking comprising comparing the universal timeout period against a clock of the thread. The method can finish with triggering an interrupt if, upon the universal timeout period being the same as the clock of the thread, and the execution of the block being not completed.

These and other objects and advantages of the present invention will become apparent to those skilled in the art from the following description of the various embodiments, when read in light of the accompanying drawings.

Figure 1:
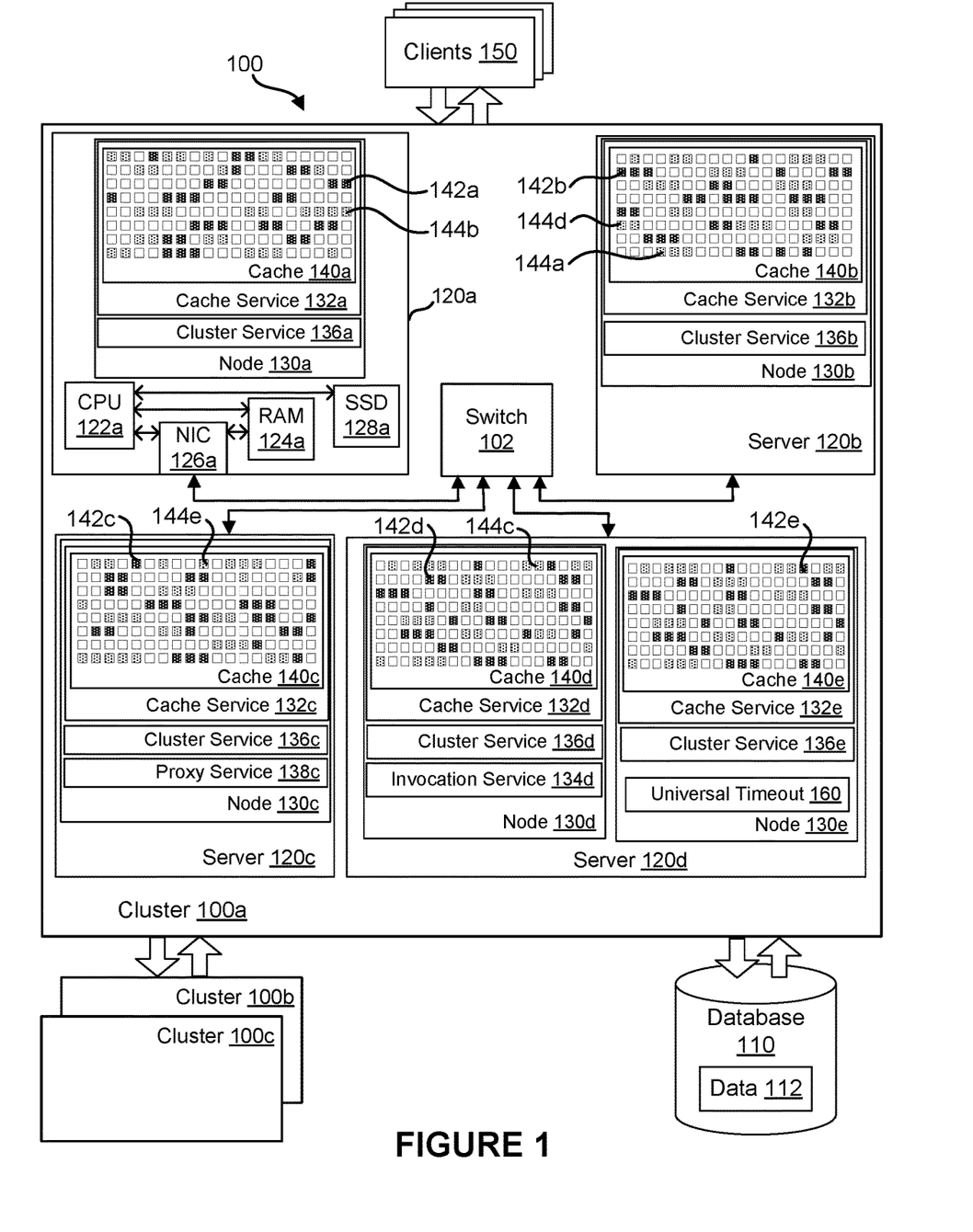
FIG. 1 illustrates a distributed data grid which supports universal timeout according to an embodiment of the invention

DETAILED DESCRIPTION:

Described herein are a system and method for universal timeout in a distributed computing environment. In embodiments of the present invention, the distributed data grid described with respect to FIG. 1 is provided a universal timeout feature as described with respect to FIGS. 2, 3A and 3B. The universal timeout feature can enforce a defined timeout for a block (or group of blocks) or code executing on a thread regardless of the number of network hops required to effectuate the code. The universal timeout feature allows a thread to express a timeout which is respected across the platform thereby improving timeout functionality compared to prior timeout implementation which pass a timeout between functions. The universal time out period can improve performance of tasks in a distributed computing environment such as a distributed data grid. The universal timeout feature improves predictability of timeout function and performance in the distributed data grid. The universal timeout mechanism is also useful in a wide variety of other distributed computing environments.

In the following description, the invention will be illustrated, by way of example and not by way of limitation, in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

The present invention is described with the aid of functional building blocks illustrating the performance of specified functions and relationships thereof. The boundaries of these functional building blocks have often been arbitrarily defined herein for the convenience of the description. Thus functions shown to be performed by the same elements may in alternative embodiments be performed by different elements. Functions shown to be performed in separate elements may instead be combined into one element. Alternate boundaries can be defined so long as the specified functions and relationships thereof are appropriately performed. Any such alternate boundaries are thus within the scope and spirit of the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears.

Distributed Data Grid

A "distributed data grid" or "data grid cluster" is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability and information reliability. As a result of these capabilities, a distributed data grid is well suited for use in computationally intensive, stateful, middle-tier applications. In particular examples, distributed data grids, such as e.g., the Oracle® Coherence data grid, store information in-memory to achieve higher performance, and employ redundancy in keeping copies of the information synchronized across multiple servers, thus ensuring resiliency of the system and continued availability of the data in the event of failure of a computer server in the cluster.

In the following description, an Oracle® Coherence data grid having a partitioned cache is described. However, one of ordinary skill in the art will understand that the present invention, described for example in the summary above, can be applied to any distributed data grid known in the art without departing from the scope of the invention. Moreover, although numerous specific details of an Oracle® Coherence distributed data grid are described to provide a thorough description of the invention, it will be apparent to those skilled in the art that the invention may be practiced in a distributed data grid without these specific details. Thus, a particular implementation of a distributed data grid embodying the present invention can, in some embodiments, exclude certain features, and/or include different, or modified features than those of the distributed data grid described herein, without departing from the scope of the invention.

FIG. 1 shows an example of a distributed data grid 100 which stores data and provides data access to clients 150. Distributed data grid 100 is a system comprising a plurality of computer servers (e.g., 120a, 120b, 120c, and 120d) which work together in one or more cluster (e.g., 100a, 100b, 100c) to store and manage information and related operations, such as computations, within a distributed or clustered environment. While distributed data grid 100 is illustrated as comprising four servers 120a, 120b, 120c, 120d, with five data nodes 130a, 130b, 130c, 130d, and 130e in a cluster 100a, the distributed data grid 100 may comprise any number of clusters and any number of servers and/or nodes in each cluster.

Distributed data grid 100 stores information in-memory (for example in the RAM of each data node) to achieve higher performance, and employ redundancy in keeping copies of that information synchronized across multiple servers, thus ensuring resiliency of the system and continued availability of the data in the event of server failure. In an embodiment, the distributed data grid 100 implements the present invention, described for example in the summary above and the detailed description below.

As illustrated in FIG. 1, distributed data grid 100 provides data storage and management capabilities by distributing data over a number of computer servers (e.g., 120a, 120b, 120c, and 120d) working together. Each server of the data grid cluster may be a conventional computer system such as, for example, a "commodity x86" server hardware platform with one to two processor sockets and two to four CPU cores per processor socket. Each server (e.g., 120a, 120b, 120c, and 120d) is configured with one or more CPU, Network Interface Card (NIC), and memory including, for example, a minimum of 4 GB of RAM up to 64 GB of RAM or more.

Server 120a of FIG. 1, is illustrated as having CPU 122a, Memory 124a and NIC 126a (these elements are also present, but not shown, in each of the other Servers 120b, 120c, 120d and servers, not shown, of additional clusters). Optionally each server may also be provided with flash memory—e.g. SSD 128a—to provide spillover storage capacity. When provided, the SSD capacity is preferably ten times the size of the RAM. The servers (e.g., 120a, 120b, 120c, 120d) in a data grid cluster 100a are connected using high bandwidth NICs (e.g., PCI-X or PCIe) to a high-performance network switch 120 (for example, gigabit Ethernet or better). The servers and clusters can be networked using for example high performance Ethernet or InfiniBand networks.

A cluster 100a preferably contains a minimum of four physical servers to avoid the possibility of data loss during a failure, but a typical installation has many more than four servers per cluster. Failover and failback are more efficient when more servers are present in each cluster and the impact of a server failure on a cluster is lessened. To minimize communication time between servers, each data grid cluster is ideally confined to a single switch 102 which provides single hop communication between all of the servers. A cluster may thus be limited by the number of ports on the switch 102. A typical cluster will therefore include between 4 and 96 physical servers networked using a single switch.

In most Wide Area Network (WAN) implementations of a distributed data grid 100, each data center in the WAN has independent, but interconnected, data grid clusters (e.g., 100a, 100b, and 100c). A WAN may, for example, include many more clusters than shown in FIG. 1. Additionally, by using interconnected but independent clusters (e.g., 100a, 100b, 100c) and/or locating interconnected, but independent, clusters in data centers that are remote from one another, the distributed data grid can secure data and service to clients 150 against simultaneous loss of all servers in one cluster caused by a natural disaster, fire, flooding, extended power loss and the like. Clusters maintained throughout the enterprise and across geographies constitute an automatic 'backup store' and high availability service for enterprise data.

One or more nodes (e.g., 130a, 130b, 130c, 130d and 130e) operate on each server (e.g., 120a, 120b, 120c, 120d)

of a cluster 100a. In a distributed data grid, the nodes may be for example, software applications, virtual machines, or the like and the servers may comprise an operating system, hypervisor or the like (not shown) on which the node operates. In an Oracle® Coherence data grid, each node is a Java virtual machine (JVM). A number of JVM/nodes may be provided on each server depending on the CPU processing power and memory available on the server. JVM/nodes may be added, started, stopped, and deleted as required by the distributed data grid. JVMs that run Oracle® Coherence automatically join and cluster when started. JVM/nodes that join a cluster are called cluster members or cluster nodes.

In an Oracle® Coherence data grid cluster members communicate using Tangosol Cluster Management Protocol (TCMP). TCMP is an IP-based protocol that is used to discover cluster members, manage the cluster, provision services, and transmit data between cluster members. The TCMP protocol provides fully reliable, in-order delivery of all messages. Since the underlying UDP/IP protocol does not provide for either reliable or in-order delivery, TCMP uses a queued, fully asynchronous ACK and NACK-based mechanism for reliable delivery of messages, with unique integral identity for guaranteed ordering of messages in queues associated with the JVMs operating on a server. The TCMP protocol requires only three UDP/IP sockets (one multicast, two unicast) and six threads per JVM/node, regardless of the cluster size.

The functionality of a data grid cluster is based on services provided by cluster nodes. Each service provided by a cluster node has a specific function. Each cluster node can participate in (be a member of) a number of cluster services, both in terms of providing and consuming the cluster services. Some cluster services are provided by all nodes in the cluster whereas other services are provided by only one or only some of the nodes in a cluster. Each service has a service name that uniquely identifies the service within the data grid cluster, and a service type, which defines what the service can do. There may be multiple named instances of each service type provided by nodes in the data grid cluster (other than the root cluster service). All services preferably provide failover and failback without any data loss.

Each service instance provided by a cluster node typically uses one service thread to provide the specific functionality of the service. For example, a distributed cache service provided by a node is provided by single service thread of the node. When the schema definition for the distributed cache is parsed in the JVM/node, a service thread is instantiated with the name specified in the schema. This service thread manages the data in the cache created using the schema definition. Some services optionally support a thread pool of worker threads that can be configured to provide the service thread with additional processing resources. The service thread cooperates with the worker threads in the thread pool to provide the specific functionality of the service.

In an Oracle® Coherence data grid, the services provided on nodes of the distributed data grid include, for example, the cluster service, the proxy service, the invocation service, and distributed cache service. The cluster service (e.g., 136a, 136b, 136c, 136d, 136e) keeps track of the membership and services in the cluster. Each cluster node always has exactly one service of this type running. The cluster service is automatically started to enable a cluster node to join the cluster. The cluster service is responsible for the detection of other cluster nodes, for detecting the failure (death) of a cluster node, and for registering the availability of other services in the cluster. The proxy service (e.g., 138c) allows connections (e.g. using TCP) from clients that run outside the cluster. The invocation Service (e.g., 134d) allows application code to invoke agents to perform operations on any node in the cluster, or any group of nodes, or across the entire cluster. Although shown on only one node each, the invocation service and proxy service can be configured on any number up to all of the nodes of the distributed data grid.

In an Oracle® Coherence data grid, the distributed cache service (e.g., 132a, 132b, 132c, 132d, 132e) is the service which provides for data storage in the distributed data grid and is operative on all nodes of the cluster that read/write/store cache data, even if the node is storage disabled. The distributed cache service allows cluster nodes to distribute (partition) data across the cluster 100a so that each piece of data in the cache is managed primarily (held) by only one cluster node. The distributed cache service handles storage operation requests such as put, get, etc. instances of the distributed cache service operating on each of the nodes manage distributed caches (e.g., 140a, 140b, 140c, 140d, 140e) defined in a distributed schema definition and partitioned among the nodes of a cluster.

A partition is the basic unit of managed data in the distributed data grid and stored in the distributed caches (e.g., 140a, 140b, 140c, 140d, and 140e). The data is logically divided into primary partitions (e.g., 142a, 142b, 142c, 142d, and 142e), that are distributed across multiple cluster nodes such that exactly one node in the cluster is responsible for each piece of data in the cache. Each cache (e.g., 140a, 140b, 140c, 140d, and 140e) can hold a number of partitions. Each partition (e.g., 142a, 142b, 142c, 142d, 142e) may hold one datum or it may hold many. A partition can be migrated from the cache of one node to the cache of another node when necessary or desirable. For example, when nodes are added to the cluster, the partitions are migrated so that they are distributed among the available nodes including newly added nodes. In a non-replicated distributed data grid there is only one active copy of each partition (the primary partition). However, there is typically also one or more replica/backup copy of each partition (stored on a different server) which is used for failover. Because the data is spread out in partition distributed among the servers of the cluster, the responsibility for managing and providing access to the data is automatically load-balanced across the cluster.

The distributed cache service can be configured so that each piece of data is backed up by one or more other cluster nodes to support failover without any data loss. For example, as shown in FIG. 1, each partition is stored in a primary partition (e.g., dark shaded squares 142a, 142b, 142c, 142d, and 142e) and one or more synchronized backup copy of the partition (e.g., light shaded squares 144a, 144b, 144c, 144d, and 144e). The backup copy of each partition is stored on a separate server/node than the primary partition with which it is synchronized. Failover of a distributed cache service on a node involves promoting the backup copy of the partition to be the primary partition. When a server/node fails, all remaining cluster nodes determine what backup partitions they hold for primary partitions on failed node. The cluster nodes then promote the backup partitions to primary partitions on whatever cluster node they are held (new backup partitions are then created).

A distributed cache is a collection of data objects. Each data object/datum can be, for example, the equivalent of a row of a database table. Each datum is associated with a unique key which identifies the datum. Each partition (e.g., 142a, 142b, 142c, 142d, 142e) may hold one datum or it may hold many and the partitions are distributed among all the nodes of the cluster. In an Oracle® Coherence data grid each key and each datum is stored as a data object serialized in an efficient uncompressed binary encoding called Portable Object Format (POF).

In order to find a particular datum, each node has a map, for example a hash map, which maps keys to partitions. The map is known to all nodes in the cluster and is synchronized and updated across all nodes of the cluster. Each partition has a backing map which maps each key associated with the partition to the corresponding datum stored in the partition. An operation associated with a particular key/datum can be received from a client at any node in the distributed data grid. When the node receives the operation, the node can provide direct access to the value/object associated with the key, if the key is associated with a primary partition on the receiving node. If the key is not associated with a primary partition on the receiving node, the node can direct the operation directly to the node holding the primary partition associated with the key (in one hop). Thus, using the hash map and the partition maps, each node can provide direct or one-hop access to every datum corresponding to every key in the distributed cache.

In some applications, data in the distributed cache is initially populated from a database 110 comprising data 112. The data 112 in database 110 is serialized, partitioned and distributed among the nodes of the distributed data grid. Distributed data grid 100 stores data objects created from data 112 from database 110 in partitions in the memory of servers 120a, 120b, 120c, 120d such that clients 150 and/or applications in data grid 100 can access those data objects directly from memory. Reading from and writing to the data objects in the distributed data grid 100 is much faster and allows more simultaneous connections than could be achieved using the database 110 directly. In-memory replication of data and guaranteed data consistency make the distributed data grid suitable for managing transactions in memory until they are persisted to an external data source such as database 110 for archiving and reporting. If changes are made to the data objects in memory the changes are synchronized between primary and backup partitions and may subsequently be written back to database 110 using asynchronous writes (write behind) to avoid bottlenecks.

Although the data is spread out across cluster nodes, a client 150 can connect to any cluster node and retrieve any datum. This is called location transparency, which means that the developer does not have to code based on the topology of the cache. In some embodiments, a client might connect to a particular service e.g., a proxy service on a particular node. In other embodiments, a connection pool or load balancer may be used to direct a client to a particular node and ensure that client connections are distributed over some or all the data nodes. However connected, a receiving node in the distributed data grid receives tasks from a client 150, and each task is associated with a particular datum, and must therefore be handled by a particular node. Whichever node receives a task (e.g. a call directed to the cache service) for a particular datum identifies the partition in which the datum is stored and the node responsible for that partition, the receiving node, then directs the task to the node holding the requested partition for example by making a remote cache call. Since each piece of data is managed by only one cluster node, an access over the network is only a "single hop" operation. This type of access is extremely scalable, since it can use point-to-point communication and thus take optimal advantage of a switched fabric network such as InfiniBand.

Similarly, a cache update operation can use the same single-hop point-to-point approach with the data being sent both to the node with the primary partition and the node with the backup copy of the partition. Modifications to the cache are not considered complete until all backups have acknowledged receipt, which guarantees that data consistency is maintained, and that no data is lost if a cluster node were to unexpectedly fail during a write operation. The distributed cache service also allows certain cluster nodes to be configured to store data, and others to be configured to not store data.

In some embodiments, a distributed data grid is optionally configured with an elastic data feature which makes use of solid state devices (e.g. SSD 128a), most typically flash drives, to provide spillover capacity for a cache. Using the elastic data feature a cache is specified to use a backing map based on a RAM or DISK journal. Journals provide a mechanism for storing object state changes. Each datum/value is recorded with reference to a specific key and in-memory trees are used to store a pointer to the datum (a tiny datum/value may be stored directly in the tree). This allows some values (data) to be stored in solid state devices (e.g. SSD 128a) while having the index/memory tree stored in memory (e.g. RAM 124a). The elastic data feature allows the distributed data grid to support larger amounts of data per node with little loss in performance compared to completely RAM-based solutions.

A distributed data grid such as the Oracle® Coherence data grid described above can improve system performance by solving data operation latency problems and by caching and processing data in real time. Applications read and write data to and from the data grid, avoiding expensive requests to back-end data sources such as databases. The shared data cache provides a single, consistent view of cached data. Reading from the cache is faster than querying back-end data sources and scales naturally with the application tier. In-memory data storage alleviates bottlenecks and reduces data contention, improving application responsiveness. Parallel query and computation is supported to improve performance for data-based calculations. The distributed data grid is fault-tolerant, providing for data reliability, accuracy, consistency, high availability, and disaster recovery. The distributed data grid enables applications to scale linearly and dynamically for predictable cost and improved resource utilization. For many applications, a distributed data grid offers a valuable shared data source solution.

In a distributed data grid as shown in FIG. 1, requests traverse the network between nodes while a user/program is waiting for a response over the network. It sometimes occurs that the request can experience hang-ups or other reasons for slowing down over the network, leading to increased latency and/or stalls. While the normal latency for a request can be on the order of milliseconds, the problem occurs when the latency increases to an unwanted level, perhaps on the order of seconds. Generally, in order to prevent such latency from indefinitely hanging up a request, a timeout is used. However, prior timeout implementations perform poorly in a distributed computing environment.

For example a request accessing a data grid can cross the network multiple times between nodes (multiple hops) and potentially call on a number of additional functions in different nodes. Code making the request may not be aware of the number of network traversals (hops) a particular request may incur, and the number of network traversals, may be different in one instance of a request compared to another depending on relative locations of data, services and the program making the request.

In a conventional timeout implementation a timeout API parameter is defined each time a request hits a network (so it can timeout if any network hangs), the parameter is passed down all the network paths an applied to each hop, thus increasing the actual timeout time. Thus, if the network timeout period is set to one second, a request that has one network traversal will timeout after one second, but a request that makes three network traversals, could take 0.9 seconds for each traversal (2.7 seconds total) without a timeout one any of the traversals. To put it another way, the total latency may exceed the timeout parameter while none of the individual network steps exceed the parameter. In embodiments of the present invention, the distributed data grid implements a universal timeout feature 160, on some or all nodes of the distributed data grid, which provides for better control of total request latency with respect to timeout thereby improving predictability and performance of computing in the distributed data grid.

There are two generally used methods for expressing a timeout. First, a timeout can often be expressed as a parameter within an API (e.g., timeout after one second if a response is not received). This can work well for simple systems where a request will generally pass once over the network. However, if the request is doing something non-trivial, such as, for example, accessing a data grid, the function/request can cross a network multiple times and potentially call on a number of additional functions, more than one of which will also require crossing the network (e.g. to request data on a different node or access a process on a different node). Defining a one second network timeout for a request means that the request will timeout if any network traversal takes longer than one second. However, in a distributed computing environment the number of network traversals needed for a particular request may be greater than one and also may not necessarily be known by the calling thread. However, because the timeout API parameter is defined each time a request hits a network (so it can timeout if any network hangs), the parameter is passed down all the network paths, thus increasing the effective timeout time.

For example, suppose a timeout parameter for a specific request is set to one second within an API. The request is called into a distributed data grid over a network, which then calls five other functions, all of which require network traversals. Because the API parameter is passed through to all network traversals, the actual timeout is now much greater than the one second set at the API because the timeout function must traverse additional functions, each of which can potentially go across the network. To put it another way, the effective timeout period can be one second for each of the network crossing—or up to five seconds. Because of this, the timeout parameter of one second set by the API (and expected by the originating code) can be easily exceeded. Moreover, the effective timeout period may not be knowable in advance because the number of network traversals can depend on the configuration the distributed data grid and location of data and services relevant to a particular request.

Another method for establishing a timeout is to use a configuration. However, the drawback with a configuration used for setting a timeout is still that the timeout is used for each network traversal required to respond to a request. For example, supposed a configuration was used within a data grid to set a timeout at 800 milliseconds for each network traversal. If there are three independent locations within the data grid where network traversal is made in response to an originating request, there is a 800 millisecond timeout associated with each network traversal associated with the original request, thus leading to potentially a 2.4 second timeout, three times more than the 800 millisecond timeout specified in the configuration (and expected by the originating code).

In order to avoid the problems with the conventional timeout implementations when used in a distributed computing environment, the distributed data grid 100 is provided with a universal timeout feature 160, as described below, which can enforce a defined timeout for a block (or group of blocks) or code executing on a thread on a node in the distributed data grid regardless of the number of network hops required to effectuate the block of code. The universal timeout feature allows a thread to express a timeout which is respected across the platform thereby improving timeout functionality compared to prior timeout implementation which pass a timeout between functions.

Universal Timeout

In situations when a request is working within a system that uses a network, the request traverses the network while a user/program is waiting for a response over the network. It sometimes occurs that the request can experience hang-ups or other reasons for slowing down over the network, leading to increases latency and stalls. While the normal latency for a request can be on the order of milliseconds, the problem occurs when the latency increases to an unwanted level, perhaps on the order of seconds. Generally, in order to prevent such latency from indefinitely hanging up a request, a timeout is used.

In embodiments of the present invention, the distributed data grid 100 implements a universal timeout feature 160 which provides for better control of total request latency with respect to timeout thereby improving control and performance of computing in the distributed data grid. The universal timeout feature allows for specification of a timeout for a request called from an originating block of code which is applied as specified regardless of how many network traversals are utilized in responding to the request.

In accordance with an embodiment, a universal timeout can be implemented using a programming resource, such as try-with resource in the JAVA programming language. Within a certain block of code, a timeout, having a specified amount of time, can be configured as a resource such that all steps within the certain block must run within the specified amount of time. If all steps within the block are not run within the specified time period, regardless of the number of steps or the number of times the network is traversed when the certain block is executing, then the timeout is called and, for example, an interrupt can be triggered. This provides better control of total request latency to the block of code thereby improving predictability and performance of computing in the distributed data grid.

In the JAVA programming language, a try block can be used in constructing an exception handler. The code which might throw an exception is enclosed within a try block. In general, a try block includes a try statement {the code to be executed in the block} followed by catch and finally blocks. Braces, also known as curly braces, use { and } to delimit compound statements. If an exception occurs within the try block the exception is handled by the exception handler associated with it by the catch block. The finally block closes out the try block and is always executed even if an unexpected exception occurs. A try-with-resources statement is a try statement that declares one or more resources. A resource is an object that must be closed after the program is finished with it. The try-with-resources statement ensures that each resource is closed at the end of the statement. In particular the finally block is an important tool for preventing resource leaks placing code for recovering resources in the finally block ensure that resource is always recovered. Thus, in an implementation of the universal timeout the code can be enclosed in a try-with-resources statement which declares time as the resource.

The universal timeout feature is, in an embodiment, implemented by leveraging the try-with-resources function of the JAVA programming language in part by treating time as a resource. You define a block of code between braces, upon entering this block of code, you acquire the timeout period as a resource, and upon leaving the block of code, you give up the resource. For example, within a certain block of code having a timeout resource value set to 1 second, the system will determine that there is one second to perform all operations within the certain block of code. If the block of code cannot be completed within the one second, then, for example, an interrupt can be triggered. The code block can be automatically interrupted after the amount of time specified in the timeout resource value if the block has not been completed. Unlike the prior timeout implementations, the timeout is not applied to each network traversal independently. This prevents branching/nesting problems from increasing the effective timeout period as the timeout is no longer duplicated for each network traversal.

The universal timeout feature can also be contextual. Thus entering a block of code the timeout value is declared and stored as a threadlocal variable. The threadlocal variable is constantly updated to indicate how much time is left. If the timeout value is one second and a first request in the block uses 100 milliseconds then there will be 900 milliseconds left for the remaining processes in the block. Any time the system enters a blocking state, it can check against the threadlocal to see how much time is left based upon the set universal timeout, e.g., the system can query the threadlocal to see how much time is left. If no time is left, then an interrupt is called. If the block completes without exceeding the timeout value, after exiting from the block, the system can discard the remaining time in the threadlocal variable.

In embodiments, the universal timeout feature is also applied to nested blocks of code (code called from the block of code between the braces). In situations where there are nested blocks of code, each block will have its own specified timeout, value. The specified timeout values may be different. The universal timeout feature implements the smallest of the timeout values specified in the block/nested blocks. For example, if a nested block of code has a timeout resource value of 1 second, and the containing block has a timeout resource value of 1.5 seconds, then the universal timeout feature will operate using the smaller 1 second timeout resource value and will trigger an interrupt at 1 second.

To achieve this, when a new universal timeout object is created (for example in conjunction with entry into a nested block of code) it will query a threadlocal variable to see if a timeout has already been declared for the calling thread. If the timeout resource value specified in the nested block of code is less than any currently specified timeout value (for example the timeout specified by the containing block) then the new timeout value is written to the threadlocal. If the nested block completes, the prior timeout value (if any) is restored. When one of the blocking helper functions is called, it can obtain a remaining timeout value from the threadlocal and limits its wait accordingly, or interrupts the thread if the timeout has expired.

The universal timeout feature may implemented similarly in other programming languages including for example C++.

Figure 2:
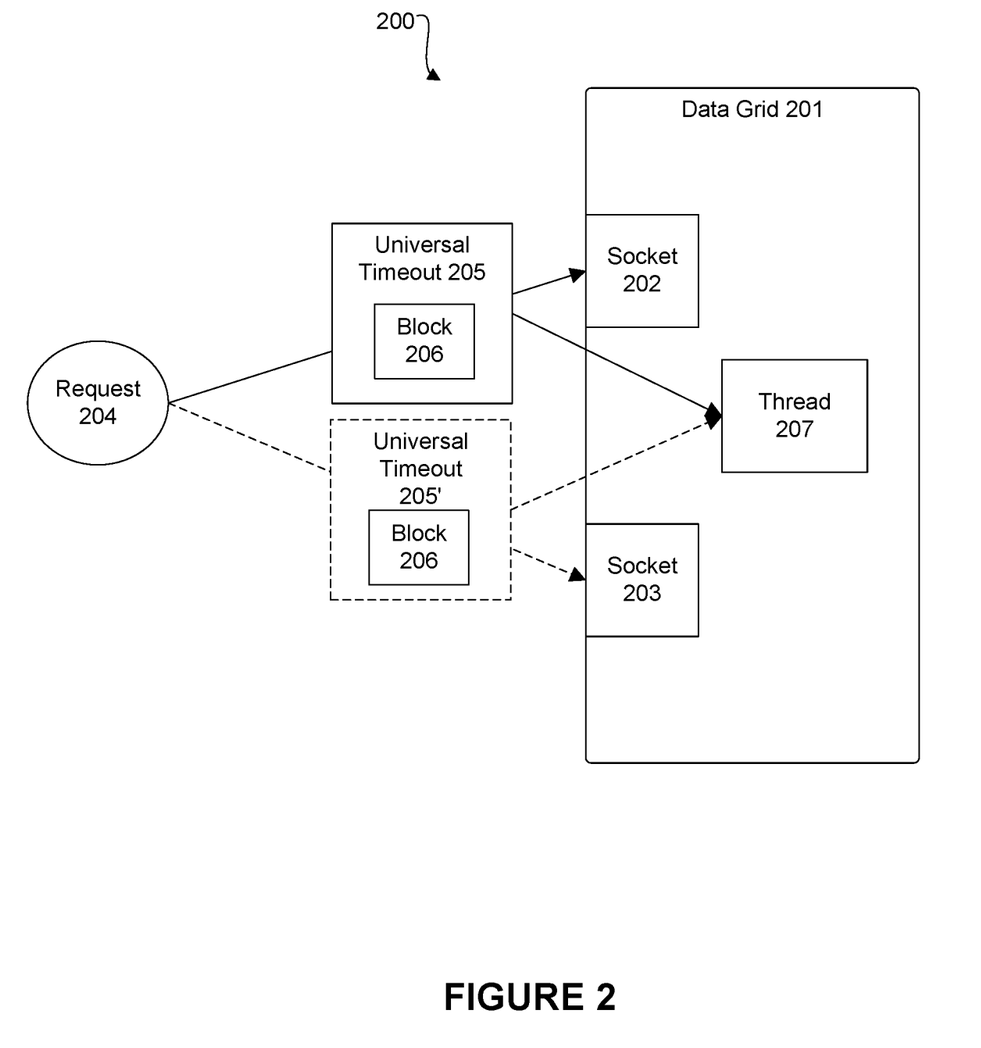
FIG. 2 illustrates supporting universal timeout in a distributed computing environment, according to an embodiment of the invention.

FIG. 2 illustrates operation of a system supporting a universal timeout feature in a distributed computing environment 200, according to an embodiment. Within the computing environment 200 is a data grid 201 and a request 204. The request can initially be targeted to socket 202 of data grid 201, and can be associated with universal timeout 205. The universal timeout 205 can contain a block of code 206 associated with request 204, the block intended to be executed within a time period as set by the universal timeout 205. In accordance with an embodiment the universal timeout has a fixed timeout value, for example 1 second. The universal timeout can check its time against a thread 207 to determine if the block 206 has executed within the universal timeout. If, after 1 second, the block 206 associated with request 204, has not been completed, due to, for example, congestion and/or network failure, then the universal timeout 205 can be triggered, which can interrupt the request 204.

Upon interrupt, the request 204 can optionally attempt to re-try at socket 202, or can optionally redirect to socket 203 of data grid 201. If the optional request to socket 203 is implemented, then the new request can again be associated with the universal timeout 205'. The universal timeout 205' can likewise check its time against thread 207 to determine if block 206 executes within the newly defined timeout period.

The universal timeout functionality can be implemented in the JAVA programming language using two classes: Timeout.java and Blocking.java. The Timeout.java class provides the mechanism for users to specify a given timeout for a particular block of code. The Blocking.java class is a set of helpers that are to be used when making a blocking call from the block of code in order to have a timeout preserved. All code blocks use these helpers in order to utilize the timeout specified using the Timeout.java class. To put it another way the Timeout.java class provides for setting the value of the timeout as a resource whereas the blocking.java class ensure that code complies with the timeout. Timeout.java example.

In accordance with an embodiment, here is an example of a mechanism to specify a given timeout.

```
try (Timeout t = Timeout.after(5, TimeUnit.SECONDS))
{
doSomething( );
}
catch (InterruptedException e) // this thread will self-interrupt
if it doesn't reach this line within 5 seconds
{
// thread timed out or was otherwise interrupted
}
```

As show in the example above, try statement provides a 5 second resource for the timeout. The doSomething( ) statement represents the code block or compound code block all of which must execute within the provided five seconds. The thread will self-interrupt if the code block or compound code block between the braces does not complete in five seconds. Any blocking code between the braces represented by the doSomenthing( ) statement should implement a blocking helper class as described, for example in the following example.

Blocking.java example.

In order for the timeout mechanism to work any blocking code executed from within the context of the Timeout (i.e. the doSomething above) use the {@link Blocking} static helper methods for blocking. An example is provided below of one of a set of static helpers that can be used when making a blocking call in order to have a timeout preserved. In certain embodiments, code can block using these helpers. It should be noted that that Timeout can only self-interrupt at interruptible points, and does not defend against CPU bound loops for example.

```
void doSomething( )
{
    Object oField = m_oField;
    synchronized (oField)
    {
        Blocking.wait(oField); // rather then oField.wait( );
    }
}
```

The Blocking.java class provides a set of helper methods related to blocking a thread. The helper methods are written to minimize their expense when they complete without timing out. As such they all take the basic approach of only checking for timeout before blocking, and truncating the blocking time such that the blocking operation will complete when timed out. In such a case the blocking operation will not throw an InterruptedException, but any subsequent blocking helper would immediately detect the timeout and interrupt the thread, which would then cause its blocking operation to throw InterruptedException (if appropriate). The benefit of this approach is that it avoids both unnecessary conditional logic, and testing/clearing the Thread's interrupt flag. Deferring the interrupt until the subsequent blocking operation is also legal as the original blocking operation simply appears to have completed spuriously.

When a new Timeout object is created it will query a ThreadLocal variable to see if a timeout has already been declared for the calling thread. If the timeout specified in this new Timeout block is less than any currently specified timeout then the new Timeout value is written to the ThreadLocal. When the TimeoutBlock completes the prior timeout (if any) is restored. Whenever one of the Blocking helper functions is called it obtains the remaining timeout value from the ThreadLocal and limits its wait accordingly, or interrupts the thread if the timeout has expired.

In an alternative embodiment, a timeout constructor can be used which allows the caller to override a parent (containing) timeout. Overriding the parent (containing) timeout by a nested object is rarely needed. It is similar in concept to silently consuming a thread interrupt without rethrowing the InterruptedException. Essentially, the timeout constructor may include a parameter which allows it to force the override a parent timeout. In such case the timeout object of thread local will be set to the timeout value of the child /nested thread even where the timeout value specified in the nested thread is greater than that in the thread local timeout object. Thus, in this case, the parent timeout can be extended if desired. The constructor can either determine the timeout using the threadlocal timeout object and determining time since it was called or by examining the prior timeout object if retained.

Figure 3A:
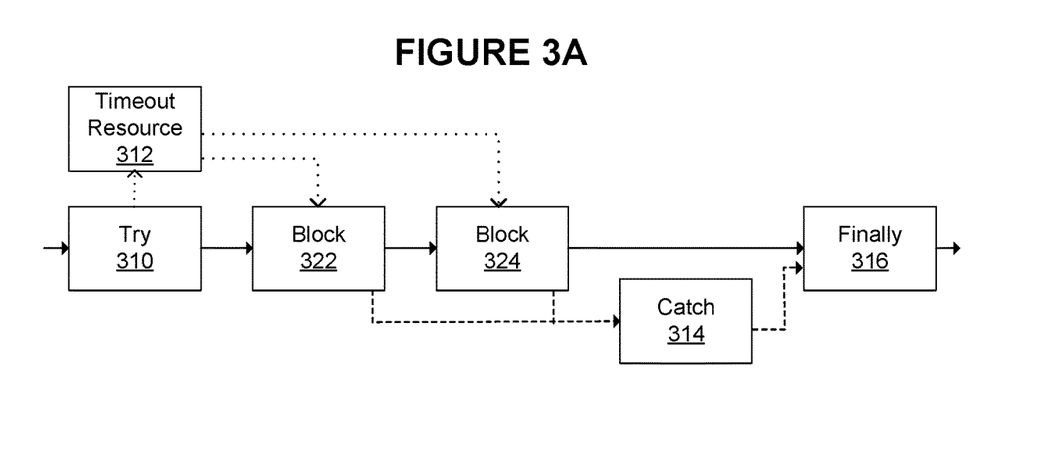
FIG. 3A illustrates operation of universal timeout on a thread, according to an embodiment of the invention.

FIG. 3A illustrates operation of universal timeout on a thread. The figure illustrates progression of a thread utilizing the universal timeout feature. As shown in FIG. 3, the thread executes the elements of a try with resource block including try block 310, catch block 314 and finally block 316. This represents timeout.java shown above. In the body of the try with resource elements are two blocking code blocks 322, and 324. These should each implement as static helper method as illustrate by blocking.java shown above.

Although two blocks are shown, any number of blocks may be included within the context of the try with resource { } statement. Moreover such blocks may call other blocks and or be nested blocks. Each of the block within the should use one of the a set of helpers in the blocking.java class that are to be used when making a blocking call in order to have a timeout specified using the Timeout.java class preserved.

Try block 310 executes first and creates a threadlocal timeout resource 310 which can be referred to by the other blocks in FIG. 3. The value of the timeout is specified in the try with resource block and can be initially, for example 1000 ms. When Block 322 executes it first refers to timeout resource 312 and determines that it has 1000 ms to run. Block 322 attempts to execute its code within the specified 1000 ms. If block 322 executes within 1000 ms the thread proceeds to block 324. If block 322 does not complete in 1000 ms an exception is triggered and handled as specified in catch 314. When block 324 is executed it refers to timeout resource 312. The value of time out resource 312 will have decreased by the amount of time required to execute block 322. Say, for example that block 322 required 100 ms to execute, then when block 324 begins to operate, there will be 900 ms of the timeout resource remaining. Block 324 thus attempts to execute its code within the specified 900 ms. If block 324 executes within 900 ms the thread proceeds to finally 316. If block 324 does not complete in 900 ms an exception is triggered and handled as specified in catch 314.

If exceptions from either block are triggered they are handled as specified in catch 314. After handling the exceptions (or any other unspecified exception occurs) or upon completion of blocks 322, 324 the thread executes finally block 316. The finally block 316 closes out the try block and is always executed even if an unexpected exception occurs. A try-with-resources statement is a try statement that declares one or more resources. A resource is an object that must be closed after the program is finished with it. The try-with-resources statement ensures that each resource is closed at the end of the statement. In particular the finally block is an important tool for preventing resource leaks placing code for recovering resources in the finally block ensures that resource is always recovered.

Note, as described above, each of block 322 and 324 could specify their own timeout values smaller than the universal timeout value specified in timeout resource 312. Thus, for example, block 322 could specify a timeout value of 500 ms. In such case, block 322 attempts to execute its code within the specified 500 ms. If block 322 executes within 500 ms the thread proceeds to block 324. If block 322 does not complete in 500 ms an exception is triggered and handled as specified in catch 314. As before, when block 324 is executed it refers to timeout resource 312. Note that the smaller timeout specified with block 322 does not affect block 324. The value of time out resource 312 will have decreased by the amount of time required to execute block 322. Say, for example that block 322 required 200 ms to execute, then when block 324 begins to operate, there will be 800 ms of the timeout resource remaining. Block 324 thus attempts to execute its code within the specified 800 ms. If block 324 executes within 800 ms the thread proceeds to finally 316. If block 324 does not complete within 800 ms an exception is triggered and handled as specified in catch 314.

Figure 3B:
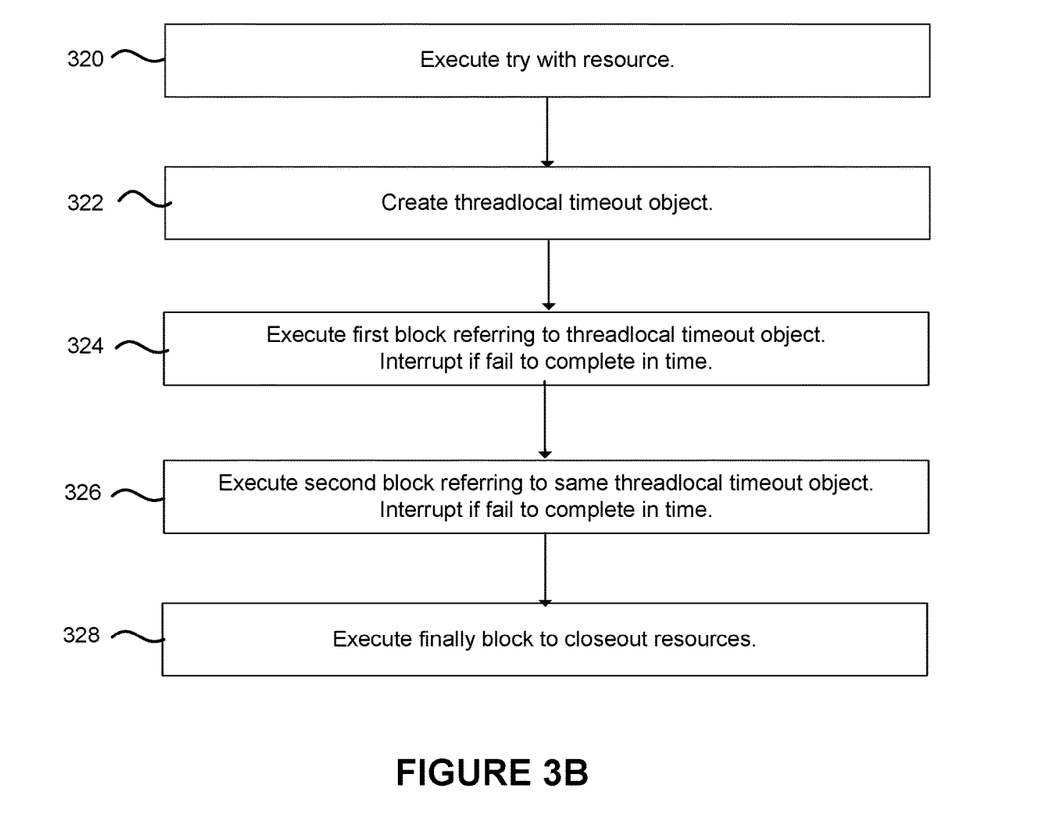
FIG. 3B illustrates a method of operation of universal timeout on a thread, according to an embodiment of the invention.

FIG. 3B illustrates a method implementing universal timeout in a thread operating in a distributed data grid according to an embodiment of the invention. As shown if FIG. 3B, at step 320, a thread executes the try statement with a time resource specified. The try resource create a threadlocal timeout object representing the time resource. The timeout resource object is accessible to other blocks in the thread (until relinquished in the finally block). The timeout resource object may be a data object which specifies a time by which all blocks within the try-with-resource must complete. At step 324, the first block in the body of the try-with-resource context is executed. The block makes reference to the threadlocal timeout object to inform the time available to complete execution. Thus the first block completes in the time specified in the threadlocal timeout object or an exception occurs (and is handled by an exception handler).

After completion of the first block, a second block is executed at step 326. The second block likewise makes reference to the threadlocal timeout object to inform the time available to complete execution. The time remaining will be reduced because some time will have been used to execute the first block. Thus the second block completes in the remaining time specified in the threadlocal timeout object or an exception occurs (and is handled by an exception handler). After completion of the second block, the thread repeats for any remaining blocks until all blocks within the context of the try-with-resource statement are either completed within the time specified by the threadlocal timeout object or an exception occurs and is handled. Finally at step 328, the finally block is executed to close out the resource of the try-with-resource context (including the threadlocal timeout object).

As described above, the universal timeout feature, is effective while also being simple to implement. Implementing the universal timeout feature eliminates the overhead of independently modifying timeouts throughout a complex code base for execution on a distributed computing environment. So in addition to providing an accurate enforced timeout function agnostic of the number of blocks or networks hops required, the universal timeout feature also simplifies the programming model as well. While illustrated with respect to the JAVA programming language, the universal timeout feature can also be implement in other object oriented programming languages, for example C++ without departing from the scope of the invention.

In an embodiment the universal timeout functionality can be implemented in the JAVA programming language using two classes implemented on each of the nodes in the distributed data grid 100: Timeout.java and Blocking.java. The Timeout.java class provides for setting the value of the timeout as a resource whereas the blocking.java class ensure that code complies with the universal timeout. Code operating on threads in the distributed data grid then utilizes the Timeout.java and Blocking.java classes in order to effectuate the universal timeout feature. All code blocks use these helpers in order to utilize the timeout specified using the Timeout.java class.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for supporting universal timeout in a distributed computing environment, the method comprising:
   establishing a universal timeout period, the universal timeout period being associated with the execution of a block of code on a thread wherein the block of code comprises a plurality of sequential blocking functions including at least first, second and third blocking functions;
   implementing the universal timeout feature using a try-with-resource statement of said block of code of said thread, wherein the universal timeout period comprises a resource of the try-with-resource statement;
   executing the try-with-resource statement and initiating a thread local variable indicating a time period for completing the block of code;
   calling the first blocking function;
   referencing the thread local variable and setting a first timeout for the first blocking function less than or equal to the time period indicated by thread local variable;
   executing the first blocking function;
   reducing the time period indicated by the thread local variable by a time taken to execute the first blocking function and triggering an interrupt upon the universal timeout period being expired as indicated by the thread local variable;
   calling the second blocking function;
   referencing the thread local variable and setting a second timeout for the second blocking function less than or equal to the time period indicated by the thread local variable as reduced by the time taken to execute the first blocking function;
   executing the second blocking function;
   reducing the time period indicated by the thread local variable by a time taken to execute the second blocking function and triggering an interrupt upon the universal timeout period being expired as indicated by the thread local variable;
   calling the third blocking function;
   referencing the thread local variable and setting a third timeout for the third blocking function less than or equal to the time indicated by the thread local variable as reduced by the time taken to execute the first blocking function and second blocking function; and
   executing the third blocking function.

2. The method of claim 1, further comprising:
reducing the time period indicated by the thread local variable by a time taken to execute the third blocking function and triggering an interrupt upon the universal timeout period being expired as indicated by the thread local variable, and the execution of the block being not completed.

3. The method of claim 1, wherein the method comprises triggering an interrupt upon the universal timeout period being the same as the clock of the thread, and the execution of the all of the plurality of blocking functions of the block being not completed.

4. The method of claim 1, wherein the plurality of blocking functions comprises one or more nested blocking functions and wherein the method comprises triggering an interrupt upon the universal timeout period being expired as indicated by referencing the thread local variable, and the execution of the block including the one or more nested blocking functions of the block being not completed.

5. The method of claim 1, wherein the plurality of blocking functions comprises a nested blocking function wherein the nested blocking function is associated with a timeout shorter than the universal timeout; and
wherein the method comprises triggering an interrupt upon the universal timeout period being expired as indicated by referencing the thread local variable, and the execution of the block including the one or more nested blocking functions of the block being not completed or upon the nested block being not completed during the timeout shorter than the universal timeout.

6. The method of claim 1, further comprising:
implementing a Timeout.java class and Blocking.java class on nodes of the distributed computing environment wherein, the Timeout.java class provides for establishing a universal timeout period for the block of code and the Blocking.Java class provides for checking against a thread the universal timeout period.

7. The method of claim 1, further comprising:
implementing a Timeout.java class and Blocking.java class on nodes of the distributed computing environment wherein, the Timeout.java class provides for establishing a universal timeout period for the block of code and the Blocking.Java class provides for checking against a thread the universal timeout period.

8. A system for supporting universal timeout in a distributed computing environment, the system comprising:
a computer server comprising a microprocessor and memory;
a thread executing on the computer server; and
wherein the thread is configured to,
establish a universal timeout period, the universal timeout period being associated with the execution of block of code on a thread wherein the block of code comprises a plurality of sequential blocking functions including at least first, second and third blocking functions;
implement the universal timeout feature using a try-with-resource statement of said block of code of said thread, wherein the universal timeout period comprises a resource of the try-with-resource statement; the try-with-resource statement and initiate a thread local variable indicating a time period for completing the block of code;
call the first blocking function;
reference the thread local variable and set a first timeout for the first blocking function less than or equal to the time period indicated by thread local variable;
execute the first blocking function;
reduce the time period indicated by the thread local variable by a time taken to execute the first blocking function and trigger an interrupt upon the universal timeout period being expired as indicated by the thread local variable;
call the second blocking function;
reference the thread local variable and set a second timeout for the second blocking function less than or equal to the time period indicated by the thread local variable as reduced by the time taken to execute the first blocking function;
execute the second blocking function;
reduce the time period indicated by the thread local variable by a time taken to execute the second blocking function and trigger an interrupt upon the universal timeout period being expired as indicated by the thread local variable;
call the third blocking function;
reference the thread local variable and set a third timeout for the third blocking function less than or equal to the time indicated by the thread local variable as reduced by the time taken to execute the first blocking function and second blocking function; and
execute the third blocking function.

9. The system of claim 8, further comprising:
reduce the time period indicated by the thread local variable by a time taken to execute the third blocking function and trigger an interrupt upon the universal timeout period being expired as indicated by the thread local variable, and the execution of the block being not completed.

10. The system of claim 8, wherein the thread is configured to trigger the interrupt upon the universal timeout period being the same as the clock of the thread, and the execution of the all of the plurality of blocking functions of the block being not completed.

11. The system of claim 8, wherein the plurality of blocking functions comprises one or more nested blocking function, and wherein the thread is configured to trigger the interrupt upon the universal timeout period being expired as indicated by referencing the thread local variable, and the execution of the block including the one or more nested blocking functions of the block being not completed.

12. The system of claim 8, wherein the plurality of blocking functions comprises a nested blocking function, wherein the nested blocking function is associated with a timeout shorter than the universal timeout; and
wherein the thread is configured to trigger an interrupt upon the universal timeout period being expired as indicated by referencing the thread local variable, and the execution of the block including the nested blocking function of the block being not completed or upon the nested block being not completed during the timeout shorter than the universal timeout.

13. The system of claim 8, further comprising:
a Timeout.java class and Blocking.java class implemented on nodes of the distributed computing environment wherein, the Timeout.java class provides for establishing a universal timeout period for the block of code and the Blocking.Java class provides for checking execution of the thread against the universal timeout period.

14. A non-transitory computer readable medium including instructions stored thereon for supporting universal timeout in a distributed computing environment, which instructions, when executed on a thread executing in the distributed computing environment cause the thread to perform steps comprising:

establishing a universal timeout period, the universal timeout period being associated with the execution of block of code on the thread, wherein the block of code comprises a plurality of sequential blocking functions, including at least first, second and third blocking functions;

implementing the universal timeout feature using a try-with-resource statement of said block of code of said thread wherein the universal timeout period comprises a resource of the try-with-resource statement;

executing the try-with-resource statement and initiating a thread local variable indicating a time period for completing execution of the block of code;

calling the first blocking function;

referencing the thread local variable and setting a first timeout for the first blocking function less than or equal to the time period indicated by thread local variable;

executing the first blocking function;

reducing the time period indicated by the thread local variable by a time taken to execute the first blocking function and triggering an interrupt upon the universal timeout period being expired as indicated by the thread local variable;

calling the second blocking function;

referencing the thread local variable and setting a second timeout for the second blocking function less than or equal to the time period indicated by the thread local variable as reduced by the time taken to execute the first blocking function;

executing the second blocking function;

reducing the time period indicated by the thread local variable by a time taken to execute the second blocking function and triggering an interrupt upon the universal timeout period being expired as indicated by the thread local variable;

calling the third blocking function;

referencing the thread local variable and setting a third timeout for the third blocking function less than or equal to the time indicated by the thread local variable as reduced by the time taken to execute the first blocking function and second blocking function; and executing the third blocking function.

15. The non-transitory computer readable medium of claim 14, the steps further comprising:

reducing the time period indicated by the thread local variable by a time taken to execute the third blocking function and triggering an interrupt upon the universal timeout period being expired as indicated by the thread local variable, and the execution of the block being not completed.

16. The non-transitory computer readable medium of claim 14, wherein the method comprises triggering an interrupt upon the universal timeout period being the same as the clock of the thread, and the execution of the all of the plurality of blocking functions of the block being not completed.

17. The non-transitory computer readable medium of claim 14, wherein the plurality of blocking functions comprises one or more nested blocking functions and wherein the method comprises triggering an interrupt upon the universal timeout period being expired as indicated by referencing the thread local variable, and the execution of the block including the one or more nested blocking functions of the block being not completed.

18. The non-transitory computer readable medium of claim 14, wherein the plurality of blocking functions comprises a nested blocking function, wherein the nested blocking function is associated with a timeout shorter than the universal timeout; and     wherein the method comprises triggering an interrupt upon the universal timeout period being expired as indicated by referencing the thread local variable, and the execution of the block including the one or more nested blocking functions of the block being not completed or upon the nested block being not completed during the timeout shorter than the universal timeout.

19. The non-transitory computer readable medium of claim 14, wherein the steps further comprise:

implementing a Timeout.java class and Blocking.java class on nodes of the distributed computing environment.

20. The non-transitory computer readable medium of claim 14, wherein the steps further comprise:

implementing a Timeout.java class and Blocking.java class on nodes of the distributed computing environment wherein, the Timeout.java class provides for establishing a universal timeout period for the block of code and the Blocking.Java class provides for checking against a thread the universal timeout period.

* * * * *